United States Patent
Kaplinsky et al.

(10) Patent No.: US 8,300,930 B2
(45) Date of Patent: Oct. 30, 2012

(54) METHOD FOR STATISTICAL ANALYSIS OF IMAGES FOR AUTOMATIC WHITE BALANCE OF COLOR CHANNEL GAINS FOR IMAGE SENSORS

(75) Inventors: Michael Kaplinsky, South Pasadena, CA (US); Igor Subbotin, South Pasadena, CA (US)

(73) Assignee: Micron Technology, Inc., Boise, ID (US)

(*) Notice: Subject to any disclaimer, the term of this patent is extended or adjusted under 35 U.S.C. 154(b) by 966 days.

(21) Appl. No.: 11/473,310

(22) Filed: Jun. 23, 2006

(65) Prior Publication Data

US 2007/0008417 A1  Jan. 11, 2007

Related U.S. Application Data

(63) Continuation of application No. 10/161,439, filed on Jun. 4, 2002, now Pat. No. 7,190,394.

(51) Int. Cl.
G06K 9/00 (2006.01)
G06K 9/34 (2006.01)
H04N 9/73 (2006.01)

(52) U.S. Cl. ........ 382/167; 382/160; 382/164; 382/165; 382/228; 382/272; 348/223.1; 348/225.1

(58) Field of Classification Search ............... 348/223.1, 348/225.1, 229.1; 382/160, 164, 165, 228, 382/272, 167
See application file for complete search history.

(56) References Cited

U.S. PATENT DOCUMENTS

| | | | |
|---|---|---|---|
| 4,953,008 A * | 8/1990 | Kaye | 348/577 |
| 5,010,393 A | 4/1991 | Saito | |
| 5,274,440 A * | 12/1993 | Miyazaki | 348/655 |
| 5,339,963 A * | 8/1994 | Tao | 209/581 |
| 5,555,022 A * | 9/1996 | Haruki et al. | 348/223.1 |
| 6,421,083 B1 | 7/2002 | Takakura | |
| 6,577,759 B1 * | 6/2003 | Caron et al. | 382/164 |
| 6,757,427 B1 * | 6/2004 | Hongu | 382/164 |
| 6,791,606 B1 | 9/2004 | Miyano | |
| 6,842,536 B2 * | 1/2005 | Aihara | 382/167 |
| 7,020,329 B2 * | 3/2006 | Prempraneerach et al. | 382/164 |
| 7,190,394 B2 * | 3/2007 | Kaplinsky et al. | 348/223.1 |
| 2002/0141615 A1 * | 10/2002 | Mcveigh et al. | 382/103 |
| 2004/0057615 A1 | 3/2004 | Johannesson et al. | |
| 2005/0134702 A1 | 6/2005 | Subbotin | |

OTHER PUBLICATIONS

Chi Zhang, P. Wang, "A New Method of Color Image Segmentation Based on Intensity and Hue Clustering," icpr, p. 3617, 15th International Conference on Pattern Recognition (ICPR'00)—vol. 3, 2000.*

* cited by examiner

Primary Examiner — Michael A Newman
(74) Attorney, Agent, or Firm — Dickstein Shapiro LLP

(57) ABSTRACT

A process for performing white balancing of an image is performed by subdividing an image into a plurality of subframes, and then analyzing each subframe to determine if that subframe is predominantly monochromatic other than gray. If so, that subframe is excluded from the computation of the gain adjustments in the white balancing operation. As a result, the white balance process is performed using only the multicolored and/or gray subframes, thus allowing the overall white-balance of the image to be shifted only when a change in the color average is due to a change in the spectra of illumination, and not a presence of large monochromatic areas in the image.

12 Claims, 4 Drawing Sheets

METHOD FOR STATISTICAL ANALYSIS OF IMAGES FOR AUTOMATIC WHITE BALANCE OF COLOR CHANNEL GAINS FOR IMAGE SENSORS

This application is a continuation of application Ser. No. 10/161,439, filed on Jun. 4, 2002, now U.S. Pat. No. 7,190,394, which is hereby incorporated by reference in its entirety.

FIELD OF THE INVENTION

The present invention relates to a method for adjusting the color gains in an imaging system to compensate for the variations in illumination spectra attributable to different illumination sources.

BACKGROUND OF THE INVENTION

The human eye and brain are capable of "white balancing." If a person takes a white card outside, it looks white. If he takes it inside and views it under fluorescent lights, it looks white. When viewed under an incandescent light bulb, the card still looks white. Even when placed under a yellow light bulb, within a few minutes, the card will look white. With each of these light sources, the white card is reflecting a different color spectrum, but the brain is smart enough to make it look white.

Obtaining the same result with a camera or other imaging device is harder. When the white card moves from light source to light source, an image sensor "sees" different colors under the different conditions. Consequently, when a digital camera is moved from outdoors (sunlight) to indoor fluorescent or incandescent light conditions, the color in the image shifts. If the white card looks white when indoors, for example, it might look bluish outside. If it looks white under fluorescent light, it might look yellowish under an incandescent lamp.

One of the most challenging problems in color image processing is adjusting the color gains of the system to compensate for the variations in the illumination spectra incident on the imaging sensor due to the illumination source, also known as white balance. This problem stems from the fact that spectral emission curves of common sources of illumination are significantly different from each other. For example, in accordance with Plank's law, the spectral energy curve of the sun is shifted towards the shorter wavelengths relative to the spectral energy curve of an incandescent light source. Therefore, the sun can be considered to be a "blue-rich" illuminator while an incandescent bulb can be considered to be a "red-rich" illuminator. As a result, if the color processing settings are not adjusted, scenes illuminated by the sunlight produce "bluish" imagery, while scenes illuminated by an incandescent source appear "reddish".

In order to compensate for changes in illumination spectra, the gains of the color processing systems and/or imager should be adjusted. This adjustment is usually performed to preserve the overall luminance (brightness) of the image. As a result of proper adjustment, gray/white areas of the image appear gray/white on the image-rendering device (hence the term "white balance"). In the absence of specific knowledge of the spectra of the illumination source, this adjustment can be performed based on inference of the spectra of illumination from an analysis of the image itself.

The most commonly used approach to computing the proper adjustment to the color channel gains is based on the premise that in complex images all colors are represented equally. Based on this assumption, the sums of all red, green and blue components in the image should be equal (in other words, the image should average to gray). Following this approach, the overall (average over the entire image) luminance Y, and red (R_avg), green (G_avg) and blue (B_avg) components are evaluated. The color gains (G_red, G_Green, G_blue) are then selected so that Y=G_red*R_avg=G_green*G_avg=G_blue*B_avg.

This conventional approach produces reasonable color rendition for images containing a large number of objects of different colors or large gray areas, such as that shown in region "A" indicated in FIG. 1. However, if the image contains any large monochrome regions, such as that shown in region "B" indicated in FIG. 1, the conventional approach fails. This is the case in many practical situations. Typical examples of such images with a large area having only one color include landscapes in which a significant portion of the image is occupied by either blue sky or green vegetation. Other examples include close-up images of people, wherein flesh tones occupy a significant portion of the image. Yet another example is a non-gray wall serving as a background of the image.

In all of the above scenarios, the averages of the color components of the image would not be equal. An adjustment of the gains based on such proportions would not produce a properly white-balanced image. In other words, the conventional approach to white balancing an image does not distinguish between shifts in the spectra of illumination or the presence of large monochromatic regions in the image.

BRIEF SUMMARY OF THE INVENTION

The present invention addresses the problems with the prior art approach by performing a statistical analysis of the image that distinguishes between effects on the color averages due to a change in the spectra of illumination and those due to the presence of large monochromatic regions in the image.

Specifically, the method of the present invention subdivides an image frame into a plurality of subframes, and each subframe is analyzed to determine if that subframe is predominantly monochromatic other than gray or white. If so, that subframe is excluded from the computation of the gain adjustments. As a result, the white balance process is performed using only the multicolored and/or gray subframes, thus allowing the overall white-balance of the image to be shifted only when a change in the color average is due to a change in the spectra of illumination, and not a presence of large monochromatic areas in the image.

Other features and advantages of the present invention will become apparent from the following description of the invention which refers to the accompanying drawings.

DETAILED DESCRIPTION OF THE INVENTION

Figure 1:
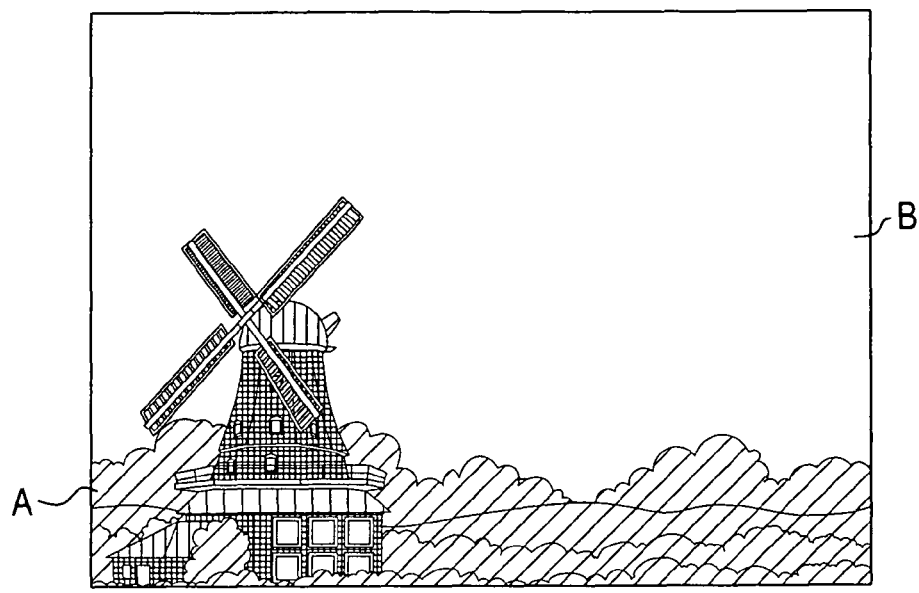
FIG. 1 demonstrates an image having large monochromatic areas and to which the method of the present invention is applicable for a white balancing operation.
Figure 2:
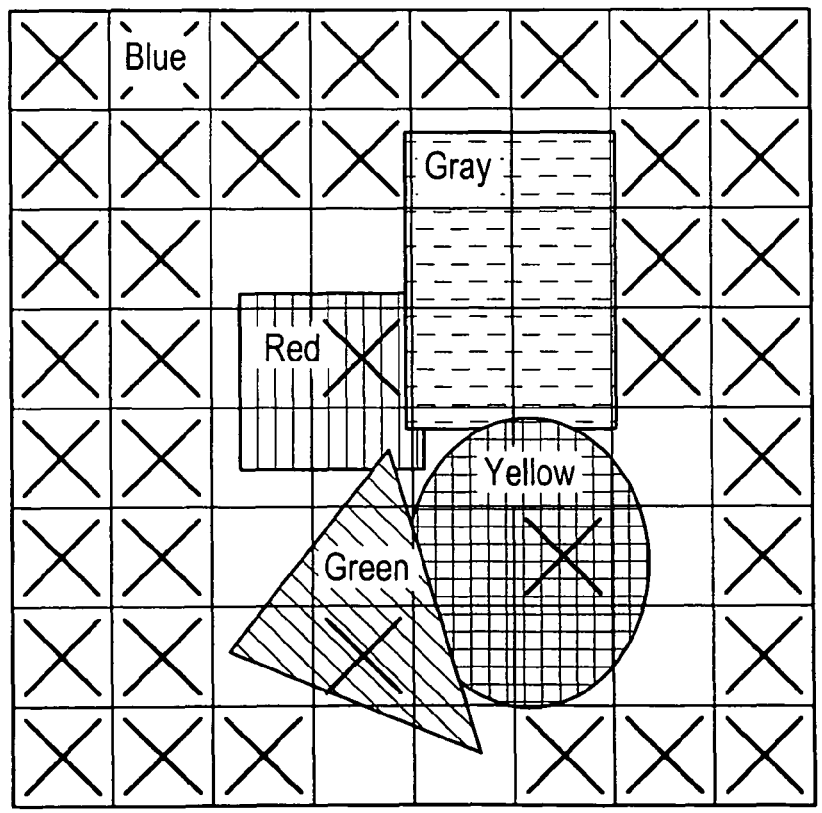
FIG. 2 illustrates the method of the present invention.
Figure 3:
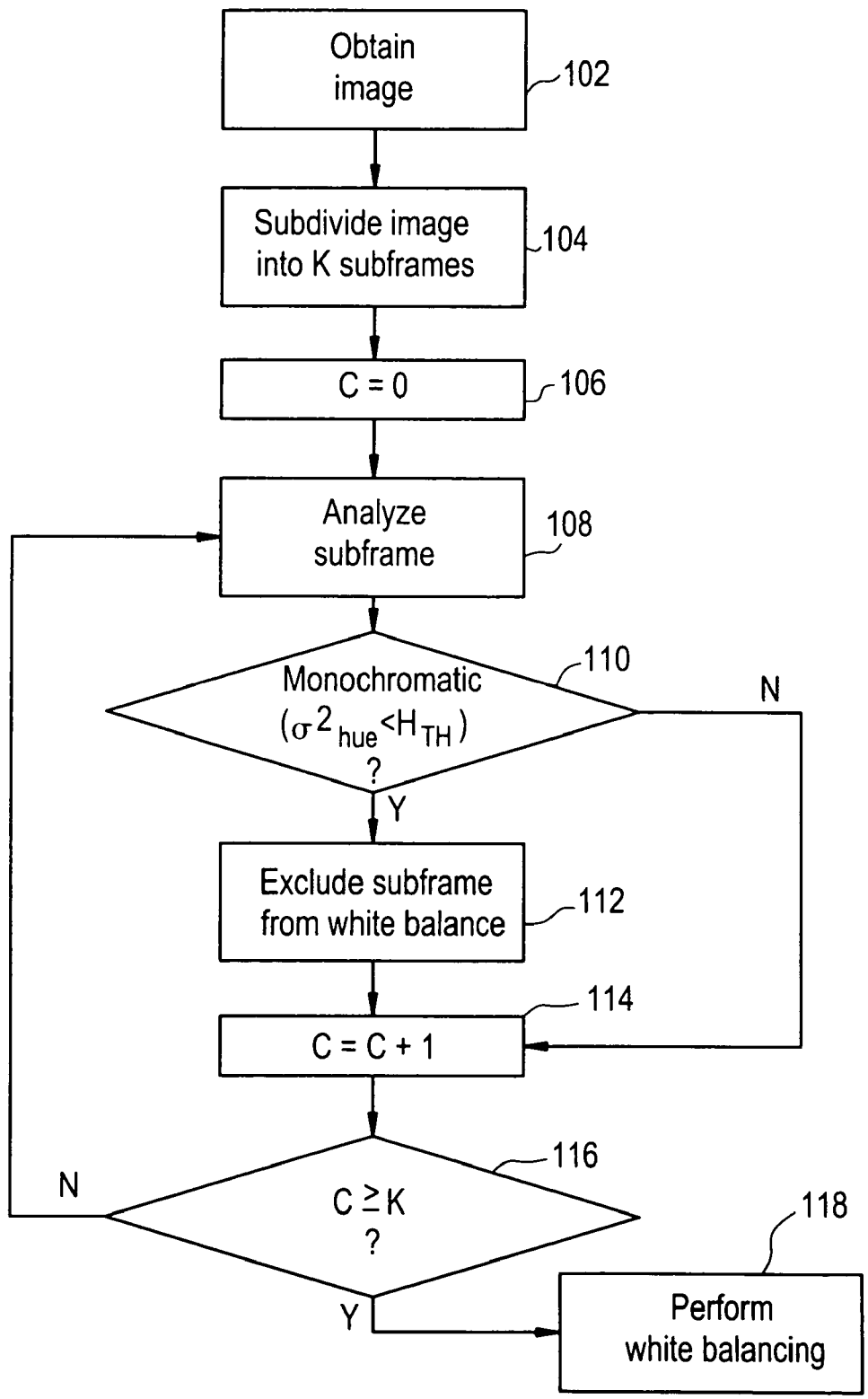
FIG. 3 is a processing flowchart for illustrating method of the present invention.

FIG. 3 illustrate a processing method which can be carried out by a microprocessor or a microcontroller of an image sensor. In the method according to the present invention, an image obtained from an imaging device such as an image sensor at processing segment 102 is subdivided into a plurality of subframes as shown in FIG. 2 and indicated as processing segment 104 in FIG. 3. In the exemplary processing method illustrated in FIG. 3, the image frame is divided into K subframes, wherein K is the number of subframes.

Each subframe is then individually analyzed to determine whether the given subframe includes multicolored or gray areas at processing segments 108 and 110. At processing segment 106, before any subframes are analyzed, a counter variable C is set to 0 for keeping track of the number of subframes in the image frame that have been analyzed.

Each subframe is analyzed at processing segment 108 by first obtaining the value of hue for each pixel in the subframe using Eqs. 1-10 as follows:

$$M=\max(R,G,B) \quad (\text{Eq. 1})[1]$$

$$m=\min(R,G,B) \quad (\text{Eq. 2})[1]$$

$$r=(M-G)/(M-m) \quad (\text{Eq. 3})[1]$$

$$g=(M-G)/(M-m) \quad (\text{Eq. 4})[1]$$

$$b=(M-B)/(M-m) \quad (\text{Eq. 5})[1]$$

$$\text{if } R=M \text{ then Hue}=60(b-g) \quad (\text{Eq. 6})[1]$$

$$\text{if } G=M \text{ then Hue}=60(2+r-b) \quad (\text{Eq. 7})[1]$$

$$\text{if } B=M \text{ then Hue}=60(4+g-r) \quad (\text{Eq. 8})[1]$$

$$\text{if Hue}>360 \text{ then Hue}=\text{Hue}-360 \quad (\text{Eq. 9})[1]$$

$$\text{if Hue}<0 \text{ then Hue}=\text{Hue}+360 \quad (\text{Eq. 10})[1]$$

[1] Reference: Keith Jack, "Chapter 3, Color Spaces," *Video Demystified*, pp. 50-51 (HighText 2d ed. 1996).

In the equations above, R, G and B are the signal levels for R, G and B, respectively, for each pixel, and M and m determine the highest and lowest values, respectively, of R, G and B. Thus, if R has the highest value, then the hue value of the pixel is calculated using Eq. 6. If G has the highest value, then the hue value of the pixel is calculated using Eq. 7. Similarly, if B has the highest value, then the hue value of the pixel is calculated using Eq. 8.

Based on the hue values for each of the pixels, a mean hue is calculated, and then the standard deviation of hue across each subframe is calculated using the difference between each hue value and the mean value as set forth in Eq. 11 below.

$$\sigma^2_{hue}=1/N\cdot\Sigma(\Delta\text{Hue}_i)^2, \quad (\text{Eq. 11})$$

wherein N is the number of pixels in the subframe, and $\Delta\text{Hue}_i=\text{Hue}_i-\overline{\text{Hue}_i}$; if $\Delta\text{Hue}_i>180$ then $\Delta\text{Hue}_i=360-\Delta\text{Hue}_i$ For this calculation, any pixels at the saturation level for any or all of the color components in the image are not considered since they do not convey useful color information for white balance purposes. For example, a white pixel which results from all of the color components being at a saturated level are not considered in the deviance calculation. However, white-appearing pixels which are simply a bright shade of grey are considered in the calculation.

Also, it is noted that gray colors are typically grayscale tones composed of very low levels of one or more of the color components. At a pixel level, such gray areas in the image appear as multi-colored areas due to spatial noise, which therefore creates very large deviations in hue values from pixel to pixel. This is very beneficial for the stability of the white balance algorithm, as color gain computation requires the adjustment of gains so that the image averages to gray.

The standard deviation obtained in Eq. 11 is then compared against a predetermined threshold $H_{th}$ at processing segment 110. Subframes standard deviations of hue less than $H_{th}$ are considered to be monochromatic and are excluded from the statistics gathering process used to calculate the white balance of the image in processing segment 112. For Eq. 11, the threshold of comparison $H_{th}$ to determine if a subframe is monochromatic is approximately in the range of 10 to 40 for 8-bit depths of pixel color, although this number may vary according to the system parameters in the implementation of the invention.

Once a subframe has been analyzed at segments 108 and 110, and a subframe is excluded (segment 112) or not from use in a white balance connection, the counter variable is incremented by one at processing segment 114 and then it is determined whether or not the number of subframes which have been processed is equal to K, the total number of subframes, at processing segment 116. If not, the process returns to segment 108 to analyze the next subframe.

After the monochromatic subframes have been identified and excluded from the white balancing process in segment 112, the white balancing process may be performed in processing segment 118 using the non-excluded subframes in any known method or algorithm that effectuates the adjustment of the balance between the color components in the image in processing segment 118. For example, color balancing is typically performed by summing each of the values for red, green and blue, respectively, and weighting the sums so that the three components are equal, whereupon each of the individual pixel datum is adjusted by the weighted value for the corresponding color component.

Alternative embodiments of the method of the present invention may be used in which the calculation of hue and its standard deviation for each subframe may be approximated with simpler schemes, to simplify hardware implementation.

In the embodiment discussed above, Eqs. 6-10 for calculating the hue value of each pixel are based on the commonly used color wheel representation of hue in the visible spectrum, wherein each color, or hue, is expressed as a value within the range of 0° to 360°. In one alternative embodiment of this invention, the range of hue is redefined to have values along a scale of 0 to 96. The hue value determinations of this embodiment are executed at processing segment 108 using the modified Eqs. 12-16 below.

$$\text{if } R=M \text{ then Hue}=16(b-g) \quad (\text{Eq. 12})$$

$$\text{if } G=M \text{ then Hue}=16(2+r-b) \quad (\text{Eq. 13})$$

$$\text{if } B=M \text{ then Hue}=16(4+g-r) \quad (\text{Eq. 14})$$

$$\text{if Hue}>96 \text{ then Hue}=\text{Hue}-96 \quad (\text{Eq. 15})$$

$$\text{if Hue}<0 \text{ then Hue}=\text{Hue}+96 \quad (\text{Eq. 16})$$

Although redefining the hue range in this manner results in a coarser evaluation of the hue value for each pixel, it does not modify the general concept behind the present invention, but allows the analysis of processing segment 108 to be performed with 6-bit wide hues and requires only 4 bits for the multiplication by 16 in Eqs. 12-14, instead of the 6 bits needed for multiplication by 60 in Eqs. 6-8. Such modification therefore makes the computations more efficient.

In another embodiment of the present invention, the calculation of hue variances in the analysis of the subframes at processing segment 108 uses sums of the absolute value of the differences between the current hue and the mean hue, as set forth in Eq. 17, instead of the squares of the same as employed in Eq. 11.

$$\sigma^2_{hue} = 1/N \cdot \Sigma |\Delta Hue_i|, \quad \text{(Eq. 17)}$$

wherein N is the number of pixels in the subframe, and $\Delta Hue_i = Hue_i - \overline{Hue_i}$; if $\Delta Hue_i > 48$ then $\Delta Hue_i = 96 - \Delta Hue_i$ If $\sigma^2_{hue} > H_{th}$, then all the pixels in the subframe are determined to be monochromatic at processing segment 110, and hence are excluded from the computation of the average color values of the image. In this embodiment, preferable values for $H_{th}$ are in the range from 3 to 10 for 8-bit color pixel depth. More preferably, the value of the threshold for determining whether or not the subframes are monochromatic is approximately 5. Again, however, the threshold value for this determination may vary depending on the system parameters of the apparatus.

In yet another embodiment of the analysis performed at processing segment 108, the hue variances are calculated based on the subdivision of the subframes into macropixels (smaller subframes). Each subframe for which variance of hue is to be computed is subdivided into a small number of areas (subsubframes or macropixels). Instead of calculating the hue value for each pixel, the color averages are computed for each macropixel as a whole to obtain a single value of hue for each of the macropixels. In Eqs. 11 and 17, therefore, N represents the number of macropixels and the mean hue is based on the values for the macropixels rather than the pixels. This further reduces the computational complexity of the method of the present invention.

In a further embodiment of the analysis performed at segment 108, the mean value of hue in each subframe is calculated only for the first few lines of the subframe. The estimated mean hue value is then used in either Eq. 11 or Eq. 17 instead of the true mean hue value. This allows for real-time single pass image processing without the need to compute the mean values on a first pass and then the variances on a second pass. In the embodiments described above, it is first necessary to determine the hue for each pixel or macropixel in the subframe in a first pass to determine the mean hue, and then to calculate the difference between the hue of each pixel and the mean in a second pass, to determine the standard deviation. In contrast, in this embodiment, by estimating the mean hue using only the first few lines in the subframe, the standard deviation can be calculated upon determining the hue value for each of the remaining pixels by determining the difference between each value and the estimated mean in the same pass.

Since a monochromatic subframe will have approximately the same mean value of hue whether a few lines are considered or the whole subframe is considered, the driving concept behind the invention is still utilized while significantly reducing the amount of calculation necessary for the implementation. As a result, this embodiment of the present invention can be implemented in real-time systems without a frame memory because it operates only on the incoming data stream.

In the example shown in FIG. 2, each subframe marked with an "X" is determined to be monochromatic, and is hence excluded from the white balancing operation. Subframes having two or more colors, such as the edge regions of the displayed shapes, are not eliminated, as well as the subframes which are indicated as being substantially grey in color. Since the hue variances for the subframes which are substantially grey in color are undefined, they will not be less than the predetermined threshold value for Eqs. 11 and 17 above. However, the three subframes which include a very thin grey region and form the right side of the grey rectangle are eliminated because those subframes are determined to be substantially monochromatic (blue).

Figure 4:
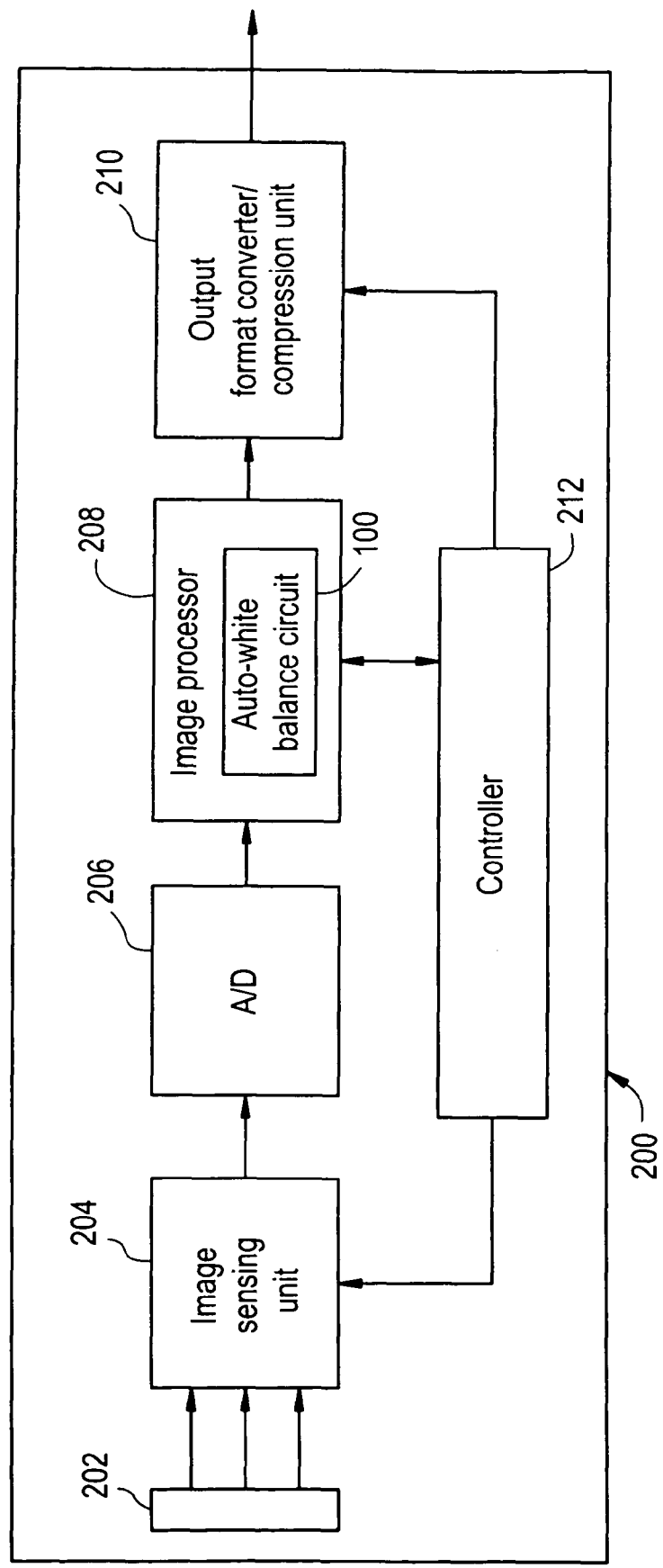
FIG. 4 is an illustration of an imaging apparatus incorporating a circuit for performing automatic white balance in accordance with the method of the present invention.

An example of an imaging apparatus 200 incorporating the features of the present invention discussed above is shown in FIG. 4, and includes a lens system 202 for directing light from an object to be imaged to the image sensing unit 204 including an image sensor; an analog-to-digital converter 206 for converting the image signals received at the image sensing unit 204 into digital signals; the image/color processing unit 208 for performing image correction processes including a circuit 100 for performing the automatic white balancing as described above and also for performing other processes such as data correction for defective pixels, color interpolation, sharpness filtering, etc.; an output format conversion/compression unit 210 for converting the image data into an appropriate file format for being outputted or displayed to the user; and a controller 212 for controlling the operations of the entire imaging apparatus 200. The image sensor in the image sensing unit 204 is preferably constructed as an integrated circuit which includes pixels made of a photosensitive material such as silicon. The image sensor may be formed as a CMOS sensor and combined with a processor, such as a CPU, digital signal processor or microprocessor, in a single integrated circuit. Alternatively, the image sensor in the image sensing unit 204 may be constructed as a charge coupled device (CCD).

Without being limiting, such an imaging apparatus 200 could include a computer system, camera system, scanner, machine vision system, vehicle navigation system, video telephone, surveillance system, auto focus system, star tracker system, motion detection system, image stabilization system and data compression system for high-definition television, all of which can utilize the present invention.

Figure 5:
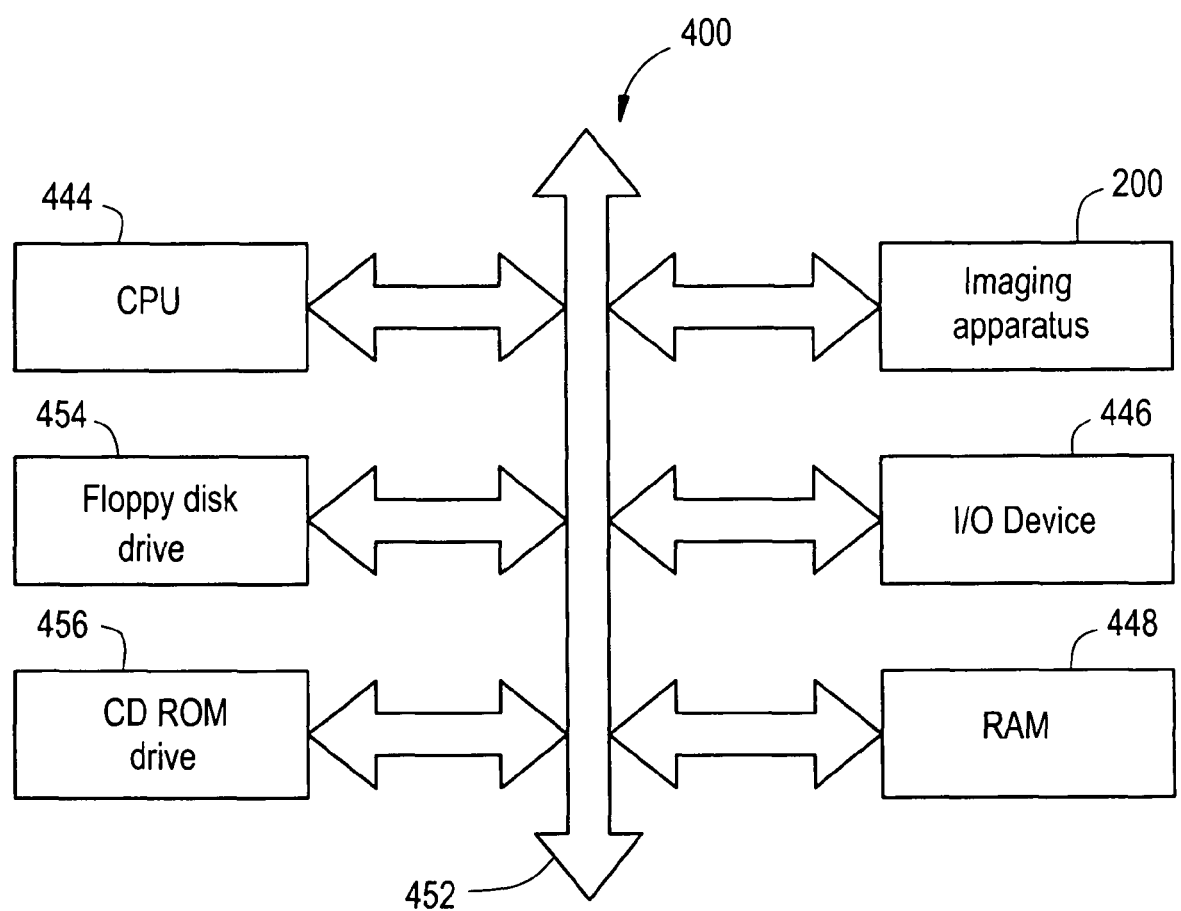
FIG. 5 is an illustration of a processing system communicating with an imaging apparatus of the present invention.

A typical processor system 400, shown in FIG. 5, such as a computer system, for example, generally comprises a central processing unit (CPU) 444 that communicates with an input/output (I/O) device 446 over a bus 452. The imaging apparatus 200 communicates with the system over bus 452 or a ported connection. The processor system 400 also includes random access memory (RAM) 448, and, in the case of a computer system, may include peripheral devices such as a floppy disk drive 454 and a compact disk (CD) ROM drive 456 which also communicate with CPU 444 over the bus 452.

Although the present invention has been described in relation to particular embodiments thereof, many other variations and modifications and other uses will become apparent to those skilled in the art. It is preferred, therefore, that the present invention be limited not by the specific disclosure herein, but only by the appended claims.

What is claimed as new and desired to be protected by Letters of the United States is:

1. A method of performing a white balance operation comprising:
   receiving an image;
   dividing the image into a plurality of individual subframes;
   determining whether or not each subframe is substantially monochromatic, wherein the determination is made independently for each individual subframe and is not affected by other subframes in the image, the determining step comprising:
      obtaining a hue value for each pixel in the subframe,
      calculating an estimated mean hue for the subframe based on the obtained hue values for a subset of lines at a beginning of the subframe, wherein the subset of lines comprises less than all lines of the subframe, calculating a standard deviation of the hue variances for the subframe using sums of the squares of the differences between the hue value for each pixel in the remaining lines of the subframe not included in the subset of lines and the mean hue, and comparing the standard deviation with a threshold value, wherein the hue value for each pixel in the subframe is used for only one of calculating the estimated mean hue or calculating the standard deviation of the hue variance, such that the determining step occurs in a single pass; and performing a white balance operation on the entire image using hue values only for the subframes which are determined to be not substantially monochromatic to make white balance determinations.

2. The method of claim 1, wherein the hue value obtained for each pixel is expressed as a value within a range from 0 to 360.

3. The method of claim 1, wherein the hue value obtained for each pixel is expressed as a value within a range from 0 to 96.

4. The method of claim 1, wherein performing the white balance operation comprises:

calculating a respective sum of all hue values for each color component in the subframes which are determined to be not substantially monochromatic;

determining a weight for each respective sum so that the three components are equal; and adjusting the hue values for each pixel in the image according to the determined weight for each color component.

5. A method of performing a white balance operation comprising:

receiving an image;

dividing the image into a plurality of individual subframes;

determining whether or not each subframe is substantially monochromatic, wherein the determination is made independently for each individual subframe and is not affected by other subframes in the image, the determining step comprising:

obtaining a hue value for each pixel in the subframe, calculating an estimated mean hue for the subframe based on the obtained hue values for a subset of lines at a beginning of the subframe, wherein the subset of lines comprises less than all lines of the subframe, calculating a standard deviation of the hue variances for the subframe using sums of the absolute values of the differences between the hue value for each pixel in the remaining lines of the subframe not included in the subset of lines and the mean hue, and comparing the standard deviation with a threshold value, wherein the hue value for each pixel in the subframe is used for only one of calculating the estimated mean hue or calculating' the standard deviation of the hue variance, such that the determining step occurs in a single pass; and performing a white balance operation on the entire image using hue values only for the subframes which are determined to be not substantially monochromatic to make white balance determinations.

6. The method of claim 5, wherein the hue value obtained for each pixel is expressed as a value within a range from 0 to 360.

7. The method of claim 5, wherein the hue value obtained for each pixel is expressed as a value within a range from 0 to 96.

8. The method of claim 5, wherein performing the white balance operation comprises:

calculating a respective sum of all hue values for each color component in the subframes which are determined to be not substantially monochromatic;

determining a weight for each respective sum so that the three components are equal; and adjusting the hue values for each pixel in the image according to the determined weight for each color component.

9. A method of performing a white balance operation comprising:

receiving an image;

dividing the image into a plurality of individual subframes;

subdividing each subframe into a plurality of macropixels, each macropixel comprising a plurality of pixels of the subframe;

determining whether or not each subframe is substantially monochromatic, wherein the determination is made independently for each individual subframe and is not affected by other subframes in the image, the determining step comprising:

obtaining a single hue value for each macropixel in the subframe as a whole, calculating a mean hue for the subframe based on the obtained macropixel hue values, calculating a standard deviation of the hue variances for the subframe using sums of the squares of the differences between the hue value for each macropixel in the subframe and the mean hue, and comparing the standard deviation with a threshold value; and performing a white balance operation on the entire image using hue values only for the subframes which are determined to be not substantially monochromatic to make white balance determinations.

10. The method of claim 9, wherein the hue value obtained for each pixel is expressed as a value within a range from 0 to 360.

11. The method of claim 9, wherein the hue value obtained for each pixel is expressed as a value within a range from 0 to 96.

12. The method of claim 9, wherein performing the white balance operation comprises:

calculating a respective sum of all hue values for each color component in the subframes which are determined to be not substantially monochromatic;

determining a weight for each respective sum so that the three components are equal; and adjusting the hue values for each pixel in the image according to the determined weight for each color component.

* * * * *

UNITED STATES PATENT AND TRADEMARK OFFICE
CERTIFICATE OF CORRECTION

| | | |
|---|---|---|
| PATENT NO. | : 8,300,930 B2 | Page 1 of 1 |
| APPLICATION NO. | : 11/473310 | |
| DATED | : October 30, 2012 | |
| INVENTOR(S) | : Michael Kaplinsky et al. | |

It is certified that error appears in the above-identified patent and that said Letters Patent is hereby corrected as shown below:

In column 7, line 53, in Claim 5, delete "calculating'the" and insert -- calculating the --, therefor.

Signed and Sealed this
Twenty-second Day of January, 2013

David J. Kappos
*Director of the United States Patent and Trademark Office*